United States Patent [19]

Kawase

[11] Patent Number: 5,420,728
[45] Date of Patent: May 30, 1995

[54] MAGNETO-OPTICAL RECORDING MEDIUM INCLUDING A PLURALITY OF RECORDING LAYERS HAVING DIFFERENT CURIE TEMPERATURES AND METHOD OF RECORDING AND READING

[75] Inventor: Takeo Kawase, Suwa, Japan

[73] Assignee: Seiko Epson Corporation, Tokyo, Japan

[21] Appl. No.: 140,334

[22] Filed: Oct. 18, 1993

Related U.S. Application Data

[63] Continuation of Ser. No. 777,412, Nov. 25, 1991, abandoned.

[30] Foreign Application Priority Data

Mar. 24, 1990 [JP] Japan ................................. 2-74137

[51] Int. Cl.⁶ .................... G11B 13/04; G11B 11/12; G11B 11/10
[52] U.S. Cl. ........................................ 360/59; 369/13
[58] Field of Search ............... 369/13; 360/59, 114; 365/122; 428/694

[56] References Cited

U.S. PATENT DOCUMENTS

| | | | |
|---|---|---|---|
| 4,908,809 | 3/1990 | Tadokoro et al. | 360/59 |
| 4,932,012 | 6/1990 | Kobayashi | 369/13 |
| 5,018,119 | 5/1991 | Aratani et al. | 360/114 |
| 5,025,430 | 6/1991 | Takoko et al. | 360/114 |

FOREIGN PATENT DOCUMENTS

| | | |
|---|---|---|
| 0258978 | 3/1988 | European Pat. Off. . |
| 58-41451 | 3/1983 | Japan . |
| 58-48249 | 3/1983 | Japan . |
| 59-22252 | 2/1984 | Japan . |
| 61-107502 | 5/1986 | Japan . |
| 61-107503 | 5/1986 | Japan . |
| 61-107553 | 5/1986 | Japan . |
| 1-149245 | 6/1989 | Japan . |
| 1-241051 | 9/1989 | Japan ............... 369/13 |

Primary Examiner—Hoa T. Nguyen
Attorney, Agent, or Firm—Stroock, Stroock & Lavan

[57] ABSTRACT

A magneto-optic recording medium is formed from a plurality of perpendicularly magnetized thin film layers, each of which is capable of recording and reproducing information. The layers are mounted on a transparent substrate which is exposed to an incident laser. Layers farther from the incident substrate have a higher Curie temperature than closer layers. Recording on multiple layers is possible because information from a desired layer is successively transferred to layers closer to the incident beam for reading the information as recording is done on layers closer to the substrate. Information in a closer layer is stored in secondary data storage when farther layers are read and then rerecorded.

10 Claims, 6 Drawing Sheets

FIG. 7(A)
INITIAL STATE

MAGNETO-OPTICAL RECORDING MEDIUM INCLUDING A PLURALITY OF RECORDING LAYERS HAVING DIFFERENT CURIE TEMPERATURES AND METHOD OF RECORDING AND READING

This is a continuation of application Ser. No. 07/777,412, filed Nov. 25, 1992, abandoned.

TECHNICAL FIELD

The present invention relates to a magneto-optical recording medium for reproducing the information from an angle of a polarizing plane by irradiation of a beam, a magneto-optical reproducing method and further a magneto-optical recording method.

BACKGROUND ARTS

An optical information recording medium for recording/reproducing the information by irradiating a recording film with a convergent beam is conceived as a large capacity storage medium. In particular, an magneto-optical disk which uses a rare-earth metal—transition metal amorphous alloy for a recording layer is utilized as an erasable large capacity recording medium. The recording films of the rare-earth metal—transition metal amorphous alloy has a large perpendicular magnetic anisotropy. Magnetization is effected upwards or downwards on the film plane. When irradiating this film surface with a linearly polarized beam, a polarizing plane of the reflected light rotates through $+\theta k$ or $-\theta k$ depending on an orientation of magnetization. This phenomenon is known as Kerr effect. The information is reproduced by detecting a rotation of this polarizing plane. In a state where a magnetic field smaller than a coercive force at a normal temperature is applied, a temperature is increased in the vicinity of a Curie temperature enough to reduce the coercive force by irradiating the perpendicular magnetizing film with a convergent beam of sufficient power to increase the temperature and reduce the coercive force. Then, the magnetization takes place towards the applied magnetic field. Based on this principle, a write of a micro magnetic domain is performed, thus recording the information. A spot of the convergent beam can be set to 1 micrometer or under. Hence, the magneto-optical disk makes a high density storage possible. Problems to be solved by the Invention:

However, a much larger capacity storage medium is needed for effecting digital recording of image information, especially of a motion picture. The recording density is further increased to respond to a demand for decreasing a medium size. In the case of the magneto-optical disk, the recording density is determined by a spot diameter of the convergent beam. If a laser beam is employed as a source of the convergent beam, the spot diameter can be contracted down to a diffraction limit and is determined by a wavelength of the laser beam and by NA of a lens for convergence. To reduce the spot diameter, a value of NA may be increased. To secure a constant working distance, a lens diameter increases. Hence, there is a limit in terms of utilization. An as-employed lens diameter is 0.50–0.55, and the upper limit thereof is, it can be said, 0.65–0.70. When shortening the wavelength of the laser beam, the spot diameter is reduced. It is required that a semiconductor laser be used as a laser beam source to reduce a size of an optical head. Shortening of the wavelength is not, however, easily attained. Particularly, a short wavelength laser having a high and a long life is difficult of utilization thereof. An objective for the time being is to decrease the as-employed wavelength of 780 nm down to 670 nm.

It is very difficult to further increase the capacity of the optomagnetic disk on the line of extension of the prior art. Accordingly, the present invention aims at making multi-layer recording possible to increase the capacity of the magneto-optical disk without waiting for shortening of the wavelength of the laser and adoption of larger NA.

DISCLOSURE OF THE INVENTION

According to one aspect of the invention, there is provided an magneto-optical recording medium for reproducing the information from an angle of a polarizing plane of reflected light by irradiation of a beam, comprising: a recording film formed by stacking a plurality of perpendicular magnetizing film layers having dirrerent Curie temperatures, characterized in that the perpendicular magnetizing film layers are exchange-coupled with the adjacent perpenducular magnetizing film layers, the perpendicular magnetizing film layers are so stacked that the perpendicular magnetizing film layers closer to an incident side of the beam have the lower Curie temperatures, and both a magnetic domain magnetized upwards and a magnetic domain of the adjacent layers of the perpendicular magnetizing film layers at room temperature.

According to another aspect of the invention, there is provided an magneto-optical reproducing method comprising the steps of: using the above-mentioned magneto-optical recording medium; effecting irradiation of a beam having a power enough to rise a temperature so as a temperature at which a magnetic domain pattern recorded on a desired perpendicular magnetizing film layer is changeable and up to a temperature at which the magnetic domain pattern recorded on the perpendicular magnetizing film layers positioned closer to an incident side of the beam than the desired perpendicular magnetizing film layer are changeable; transferring the magnetic domain pattern recorded on the desired perpendicular magnetizing film layer onto the perpendicular magnetizing film layer closest to the incident side of the beam; and thus effecting reproduction.

According to still another aspect of the invention, there is provided an magneto-optical recording method comprising the steps of: using the above-mentioned magneto-optical recording medium; applying a magnetic field; effecting irradiation of a beam having a power enough to rise a temperature up to a temperature at which a magnetization of a desired perpendicular magnetizing film layer can be changed in the orientation of the magnetic field and a temperature lower than a temperature at which a magnetic domain pattern recorded on perpendicular magnetizing film layers positioned opposite to an incident side of the beam from the desired perpendicular magnetizing film layer are changeable; and recording the magnetic domain pattern on the desired perpendicular magnetizing film layer.

Further, an improvement of the magneto-optical recording medium of this invention is characterized in that magnetic film layers and the perpendicular magnetizing film layers are exchange-coupled based on such a structure that the magnetic film layers having no magnetic anisotropy or the magnetic film layer having a magnetic anisotropy in a direction other than perpendicular to the film plane are interposed between the adjacent perpendicular magnetizing film layers.

BEST MODE FOR CARRYING OUT THE INVENTION

Figure 1:
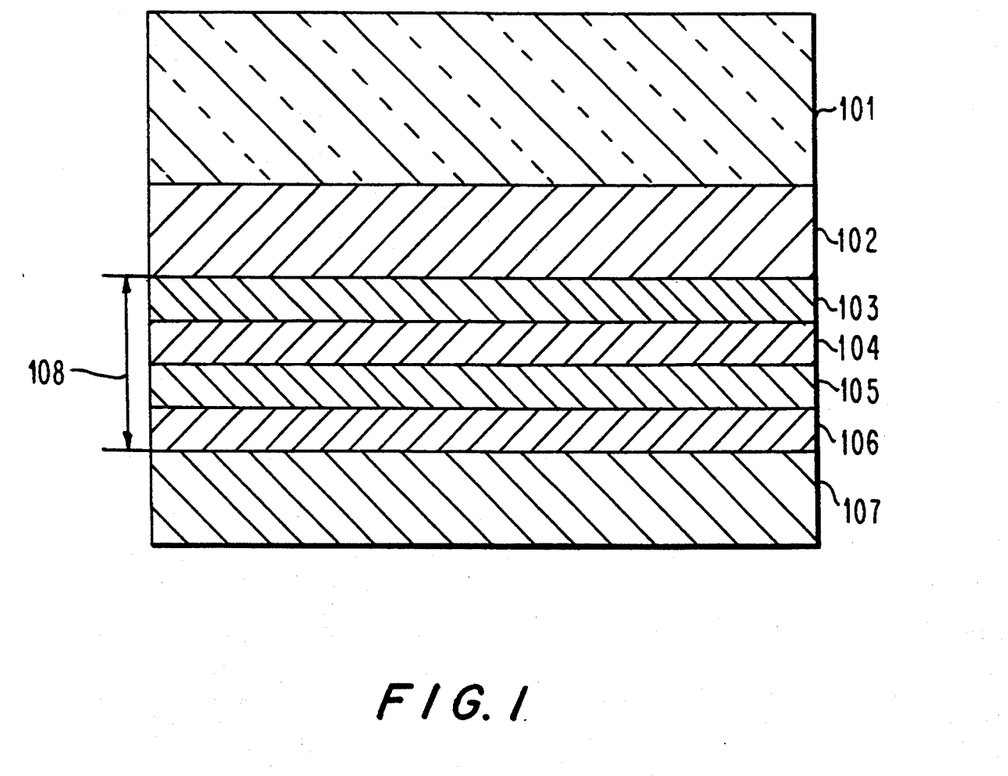
FIG. 1 is a schematic diagram illustrating a magneto-optical recording medium of this invention.

An embodiment of the present invention will be explained with reference to the drawings. FIG. 1 is a schematic diagram showing one embodiment of this invention. Formed is a dielectric layer 102 contacting with a transparent substrate 101. A first perpendicular magnetizing film layer 103 contacting with the dielectric layer 102 is formed. Further formed are a second perpendicular magnetizing film layer 104, a third perpendicular magnetizing film layer 105 and a fourth perpendicular magnetizing film layer 106. A dielectric layer 107 contacting with the fourth perpendicular magnetizing film layer is formed. The layers associated with recording of information in the form of magnetic domain pattern are the first vertical magnetizing film layer 103, the second vertical magnetizing film layer 104, the third vertical magnetizing film layer 105 and the fourth vertical magnetizing film layer 106. It can be said that these layers are combined to form a recording layer 108. The configuration of FIG. 1 may be a structure in which the recording layer 108 is sandwiched in between the dielectric layer 103 and the dielectric layer 107. Besides, the recording layer 108 takes a stacked structure of four perpendicular magnetizing film layers. The 4 layers are herein set in terms of explaining one embodiment of the present invention but do not give a limit to the present invention. an emphasis of this invention is placed on the arrangement that the recording layer 108 is effectively composed of an arbitrary number, 2 or greater, of layers.

Figure 2:
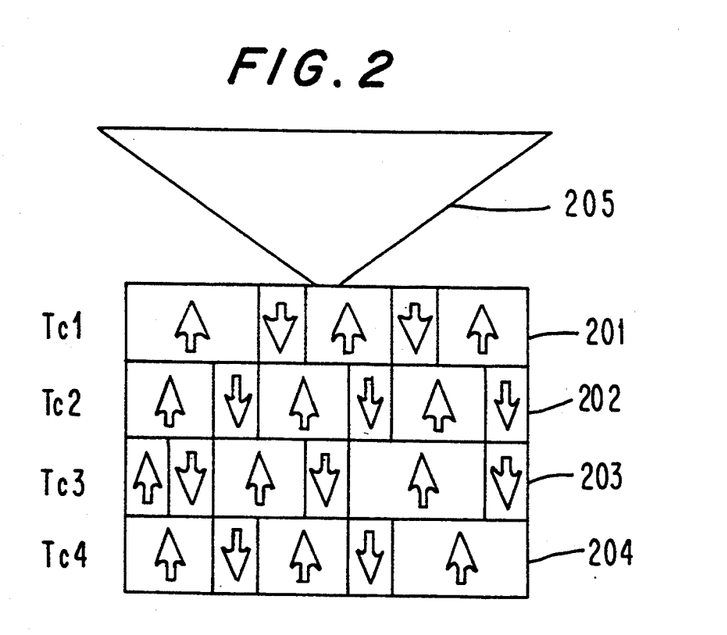
FIG. 2 is a schematic diagram showing a recording layer of the magneto-optical recording medium of this invention.

To begin with, what is needed is that Curie temperatures Tc are different from each other, and the perpendicular magnetizing film layers closer to the incident side of a light beam for reproduction have the lower Curie temperatures. This is schematically illustrated in FIG. 2. Stacked are a first perpendicular magnetizing film layer 201, a second perpendicular magnetizing film layer 202, a third perpendicular magnetizing film layer 203 and a fourth perpendicular magnetizing film layer 204 sequentially from the incident side of a convergent beam 205. Respective Curie temperatures are indicated by Tc1, Tc2, Tc3 and Tc4. A relation of each temperature is given as formula 1.

$$Tc1 < Tc2 < Tc3 < Tc4 \quad \text{Formula 1}$$

This formula is expressible as shown in the formula 2.

$$Tc(n) < Tc(n+1) \ (1 \leq n \leq (NL-1)) \quad \text{Formula 2}$$

where Tc(n) is the Curie temperature of the n-th perpendicular magnetizing film layer, and NL is the number of the perpendicular magnetizing film layers. The n-th perpendicular magnetizing film layer is formed as the n-th perpendicular magnetizing film layer is formed as the n-th layer counted from the incident side of the beam.

The adjacent perpendicular magnetizing film layers are magnetically coupled to each other, i.e., -magnetostatic bonding effected by a leak magnetic field and exchange interaction. Coupling by the latter exchange interaction is dominant over the perpendicular magnetizing films. The exchange interaction implies a relation where a spin orientation of adjacent atoms in the magnetic substance, i.e., the atoms are so arrayed as to be oriented in the same direction or in reverse direction or at a constant angle. Inter atom bonding or inter continuum bonding by this effect is referred to as exchange coupling.

The magnetic film has a coercive force and exhibit such a nature that the magnetization is not inverted in a magnetic field where the magnetization is inverted differs from that in the case of a single layer. An explanation will be given on the assumption that there are stacked two kinds of perpendicular magnetizing film layers having coercive forces Hc1, Hc2, magnetic moments Ms1, Ms2 and thicknesses h1, h2. It is required that the formula 3 and 4 be satisfied to stably form a magnetic domain magnetized upwards and downwards on one perpendicular magnetizing film layer even when a magnetizing orientation of the another perpendicular magnetizing film layer is either upward or downward.

$$Hc1 - \sigma w/(2Ms1 \ h1) > 0 \quad \text{Formula 3}$$

$$Hc2 - \sigma w/(2Ms2 \ h2) > 0 \quad \text{Formula 4}$$

where $\sigma w$ is the wall energy when a domain wall is formed between the two perpendicular magnetizing films.

Similarly, it is required that relations of the formula 5 and 6 be met to stably form a magnetic domain magnetized upwards and downwards on the n-th perpendicular magnetizing film layer independently of a magnetizing state of an (n−1)th perpendicular magnetizing film layer or an (n+1)th perpendicular magnetizing film layer in a magneto-optical recording medium.

$$Hc(n) - \sigma w(n)/(Ms(n)h(n)) > 0 (2 \leq n \leq NL-1) \quad \text{Formula 5}$$

$$Hc(n) - \sigma w(n)/(2Ms(n)h(n)) 0 (n=1, NL) \quad \text{Formula 6}$$

where Hc(n) is the coercive force of the n-th perpendicular magnetizing film layer, $\sigma w(n)$ is the wall energy, Ms(n) is the magnetic moment and h(n) is the thickness.

A relatively large coercive force can be obtained in alloys of rare-earth metals of Gd, Tb, Dy and transition metals of Fe, Co. When substituting typical values such as Ms=50 emu/cc, $\sigma w=1.5$ erg/cm$^2$ and h=1000×10$^{-8}$ cm, it proves that the formulae 5 and 6 are satisfied on condition that Hc is 3 k$\theta$e or more. This value is in such a range as to be obtained by the magnetic film of a rare-earth metal—transition metal alloy. In this embodiment also, the recording film is composed of the rare-earth metal—transition metal alloy.

Figure 3A:
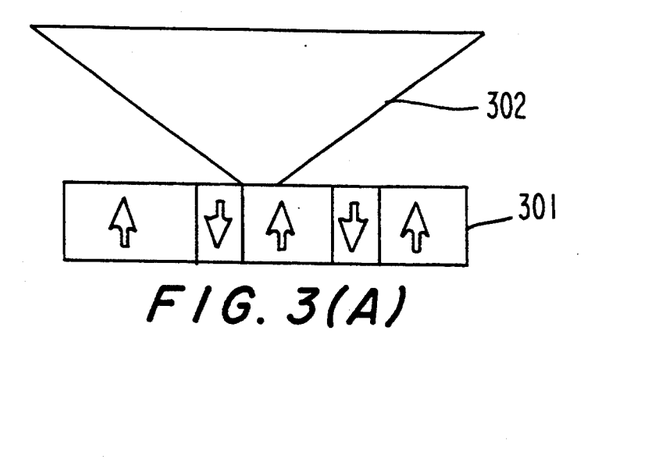
FIG. 3(A), 3(B), 3(C) are schematic diagrams illustrating recording layers of a conventional magneto-optical recording medium.
Figure 3B:
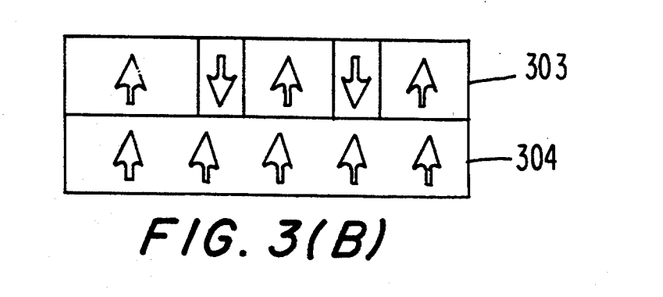
Figure 3C:
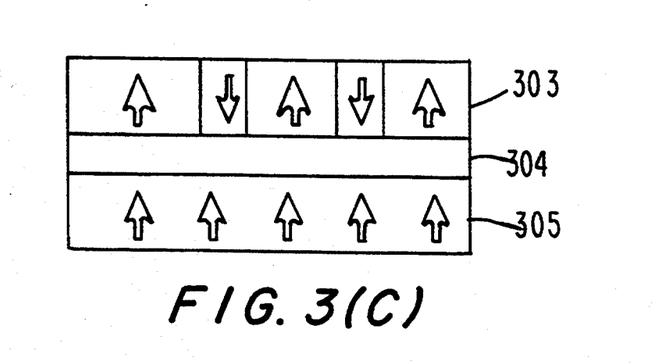

The present invention aims at improving a storage capacity of the magneto-optical recording medium. This object is accomplished by, as illustrated in FIG. 2, recording different information on the respective perpendicular magnetizing film layers constituting the recording layer. Arrowheads herein indicate magnetizing orientations. In an conventional magneto-optical recording medium, as illustrated in FIG. 3(A), the layer on which the information is recorded is a single perpendicular magnetizing film layer 301. As disclosed in Japanese patent Application Nos.: 175948/1987 and 239636/1988, there exist magneto-optical recording mediums in which two or more magnetic films are exchange-coupled with each other. these mediums are demonstrated by FIGS. 3(B) and 3(C). In any medium, the information is merely recorded on a first layer 303 closest to the incident side of the beam. In these examples, a second layer 304 and a third layer 305 are nothing but auxiliary layers for an overwrite by light modulation. These layers have not function to hold the information. As seen in Japanese Patent Laid-Open No.:276731/1989, the information is recorded on the second layer by a magnetic head for a magnetic field modulation, and the information on the second layer are transferred onto the first layer. The first layer also holds the information. The information on the second layer becomes unnecessary after being transferred onto the first layer. This information is rewritten by the magnetic head. Namely, in this conventional example, the transfer is merely carried out as one process of recording.

Based on the prior art, as discussed above, the information is recorded on the first layer closest to the incident side of the beam on the medium. In contrast, according to the present invention, the information are recorded and held on the second and subsequent layers. The following is an explanation of a method of recording the information, as depicted in FIG. 2, on the respective perpendicular magnetizing film layers and a method of reproducing the information recorded on the respective perpendicular magnetizing film layers.

Figure 4:
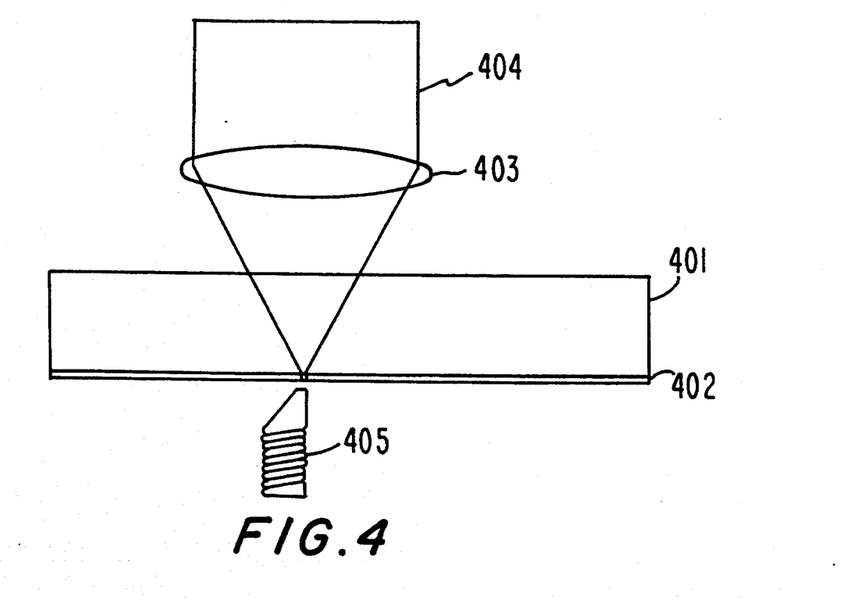
FIG. 4 is a schematic diagram showing a state where recording and reproducing are performed.

A typical method utilized as an magneto-optical recording methods is classified into a light modulation method and a magnetic field modulation method. The method based on the magnetic field modulation method will be at first described. In this case, recording is effected based on a constitution shown in FIG. 4. A recording film 402 is formed on a transparent substrate 401. This recording film 402 includes the dielectric layers 102, 107 and the recording layer 108 shown in FIG. 1. A laser beam 404 is focalized on the recording film 402 by a objective lens 403. On the occasion of recording, a power of the laser beam 404 is increased, whereby a temperature of the recording layer in the recording film 402 rises, and recording is performed by the magnetic head 405 modulating the magnetic field. FIG. 5 shows the method of recording the information on in the order of the fourth perpendicular magnetizing film layer, the third layer, the second layer and the first layer in this constitution. The configuration of the 4-layered perpendicular magnetizing films depicted therein is the same as that of FIG. 2. To start with, an power of the laser beam 404 is set to obtain a temperature Tw4 in the vicinity of the Curie temperature Tc4 of the fourth vertical magnetizing film layer or higher than that. The magnetic field is modulated by the magnetic head 405 in accordance with the information to be recorded on the fourth perpendicular magnetizing film layer while effecting continuous irradiation. The relation of the formula 1 is established between the Curie temperatures of the respective layers. Hence, a temperature at a point irradiated with the laser beam is higher than the Curie temperatures of the first, second and third perpendicular magnetizing film layers. The coercive forces of those perpendicular magnetizing film layers are zero. The coercive force of the fourth perpendicular magnetizing film layer becomes considerably small. For this reason, all the perpendicular magnetizing film layers are magnetized towards a write magnetic field applied by the magnetic head 405. In this manner, the desired information is recordable on the fourth perpendicular magnetizing film layer.

Figure 5A:
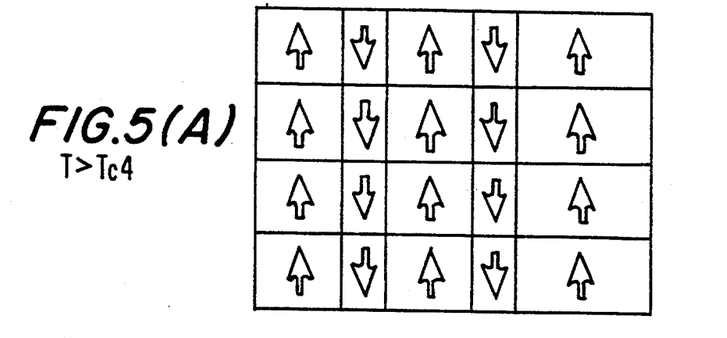
FIG. 5(A), 5(B), 5(C), 5(D) are schematic diagrams showing a recording method on the magneto-optical recording medium of this invention.
Figure 5B:
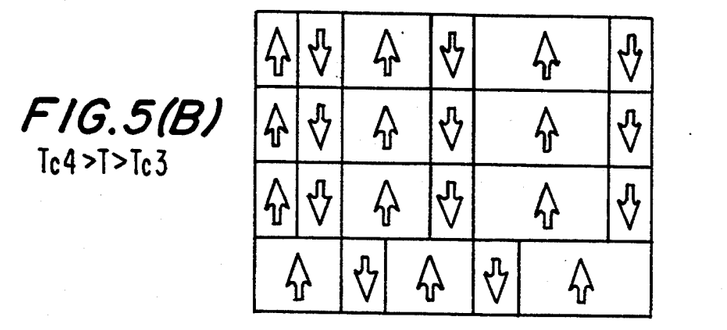

Subsequently, as power of the laser beam 404 is set to obtain a temperature Tw3 in the vicinity of the Curie temperature Tc3 and lower than the Curie temperature Tc4 of the fourth perpendicular magnetizing film layer. The magnetic field is modulated by the magnetic head 405 in accordance with the information to be recorded on the third perpendicular magnetizing film layer while effecting continuous irradiation. The temperature at the point irradiated with the laser beam is higher than the Curie temperatures Tc1, Tc2 of the first and second perpendicular magnetizing film layers from the relation of the formula 1 established at the Curie temperatures of the respective layers. The coercive forces of those perpendicular magnetizing film layers are zero. The coercive force of the third perpendicular magnetizing film layer is also considerably small. For this reason, the first, second and third perpendicular magnetizing film layers are magnetized towards the write magnetic field applied by the magnetic head 405. At that time, it is required that the formula 7 be met with respect to the write magnetic field Hw, the magnetic moment Ms4(Tw3) and the coercive force Hc4(Tw3) of the fourth perpendicular magnetizing film layer at the temperature Tw3 not to change the domain pattern of the fourth perpendicular magnetizing film layer.

$$Hw < Hc4(Tw3) - \sigma w34(Tw3)/(2Ms4(Tw3)h4) \qquad \text{Formula 7}$$

where $\sigma w34(Tw3)$ is the wall energy for forming a domain wall between the third and fourth perpendicular magnetizing film layers at Tw3, and h4 is the thickness of the fourth perpendicular magnetizing film layer. The exchange interaction is exerted from the fourth perpendicular magnetizing film layer onto the first, second and third perpendicular magnetizing films. It is required to meet the formula 8 with respect to the write magnetic field Hw necessary for writing an arbitrary magnetic domain on the first, second and third perpendicular magnetizing films by overcoming the exchange interaction. It is also necessary to satisfy the formula 98 to make the written magnetic domain stable.

$$Hw > Hc3(Tw3) + \sigma w34(Tw3)/(2\ Ms2(Tw3)H3) \qquad \text{Formula 8}$$

$$Hc3(Tw3) > \sigma w34(Tw3)/(2Ms3(Tw3)h3) \qquad \text{Formula 9}$$

where Hc3 (Tw3), Ms3 (Tw3), h3 are the coercive force, the magnetic moment, the thickness of the third perpendicular magnetizing film layer at the temperature respectively. Namely, if such a temperature and write magnetic field as to meet the formula 7, 8 and 9 are applied the magnetic domain of the fourth perpendicular magnetizing film layer does not change, and arbitrary magnetic domain patterns are writable on the first, second and third perpendicular magnetizing film layers. This state is demonstrated by FIG. 5(b).

Figure 5C:
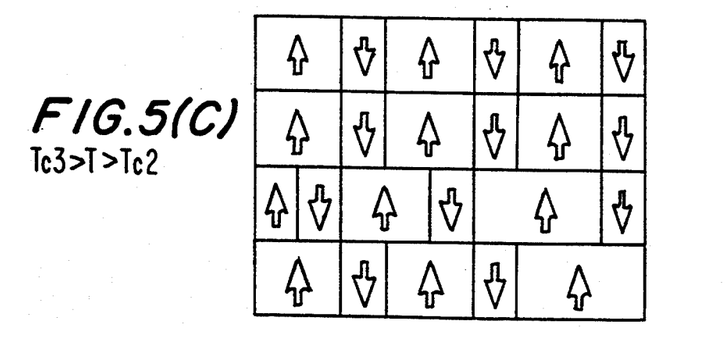

Similarly, is such a temperature Tw2 and write magnetic field Hw as to satisfy the formula 10, 11 and 12 are selected, the magnetic domain patterns of the third and fourth perpendicular magnetizing film layers do not vary. An arbitrary magnetic domain pattern is writable on the first and second perpendicular magnetizing film layers. Herein, Hc2(Tw2), Ms2(Tw2), h2 are the coercive force, the magnetic moment, the thickness of the second perpendicular magnetizing film layer at the temperature Tw2 respectively, and $\sigma w23((Tw2)$ is the wall energy for forming a domain wall between the second and third perpendicular magnetizing film layers. This state is demonstrated by FIG. 5(c).

$$Hw < Hc3(Tw2) - \sigma w23(Tw2)/(2Ms3(Tw2)\ h3) \quad \text{Formula 10}$$

$$Hw > Hc2(Tw2) + \sigma w23(Tw2)/(2Ms2(Tw2)\ h2) \quad \text{Formula 11}$$

$$Hc2(Tw2) > \sigma 23(Tw2)/(2Ms2\ (Tw2)\ h2) \quad \text{Formula 12}$$

Figure 5D:
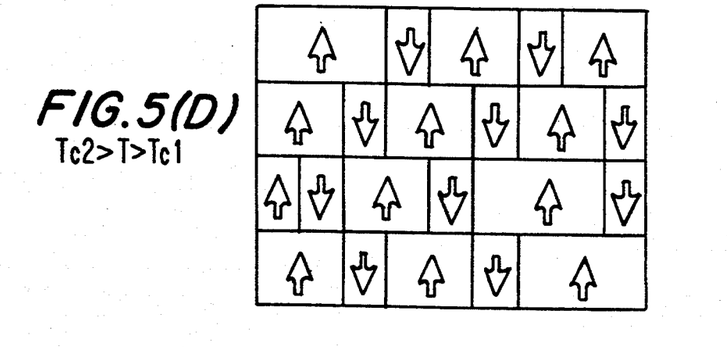

Similarly, if such a temperature Tw1 and write magnetic field Hw as to meet the formula 13, 14 and 15 are selected, the magnetic domain patters of the second, third and fourth perpendicular magnetizing film layers do not change. An arbitrary magnetic domain pattern is writable on the first perpendicular magnetizing film layer. Herein Hc1(Tw1), Ms1(Tw1), h1 are the coercive force, the magnetic moment, the thickness of the first perpendicular magnetizing film layer at the temperature Tw1 respectively, and w12(Tw1) is the wall energy for forming a domain wall between the first and second vertical magnetizing film layers. This state is demonstrated by FIG. 5(d).

$$Hw < Hc2(Tw1) - \sigma w12(Tw1)/(2Ms2(Tw1)\ h2) \quad \text{Formula 13}$$

$$Hw > Hc1(Tw1) + \sigma w12(Tw1)/(2Ms1(Tw1)\ h1) \quad \text{Formula 14}$$

$$Hc1(Tw1) > \sigma w12(Tw1)/(2Ms1(Tw1)h1) \quad \text{Formula 15}$$

Figure 6A:
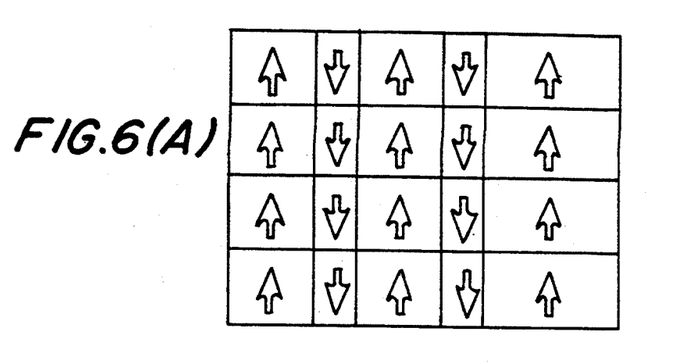
FIG. 6(A), 6(B), 6(C) are schematic diagrams showing a recording method based on a light modulation of the magneto-optical recording medium of this invention.
Figure 6B:
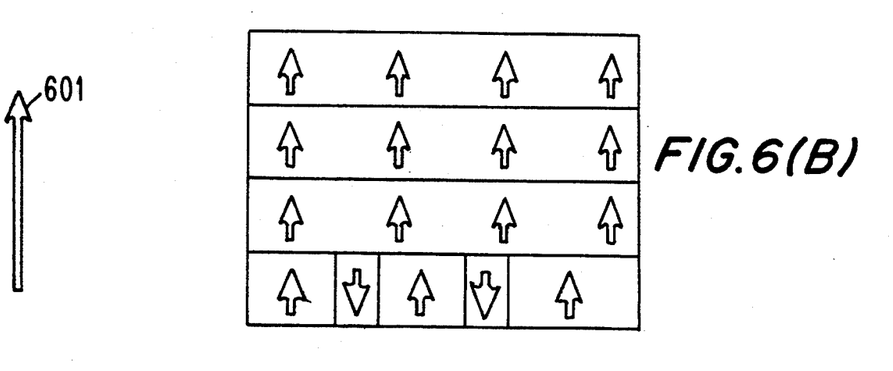
Figure 6C:
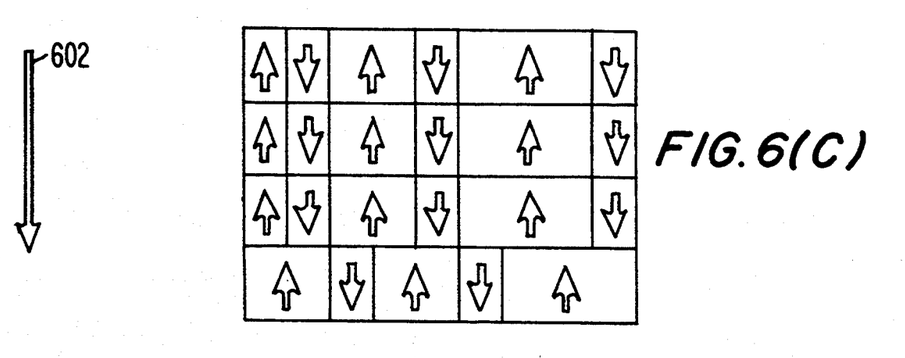
Figure 7A:
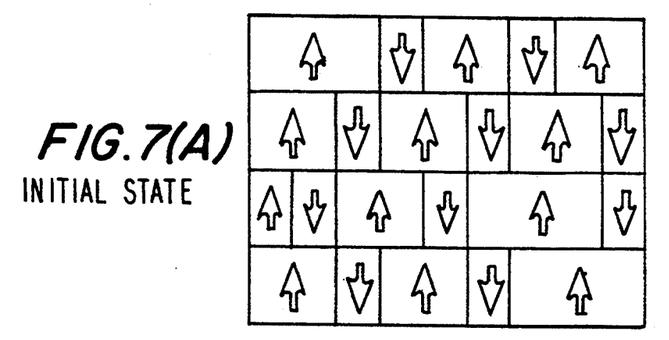
FIG. 7(A), 7(B), 7(C), 7(D) are schematic diagrams showing a reproducing method of the magneto-optical recording medium of this invention.
Figure 7B:
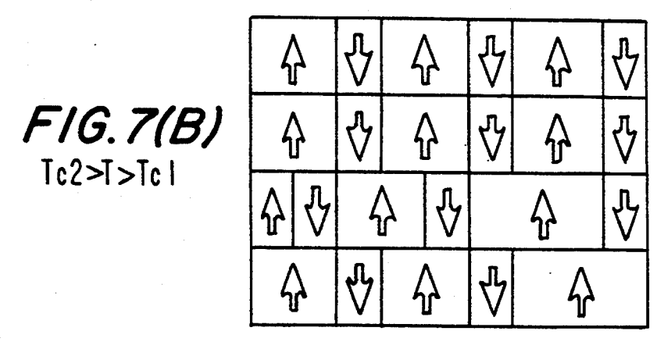
Figure 7C:
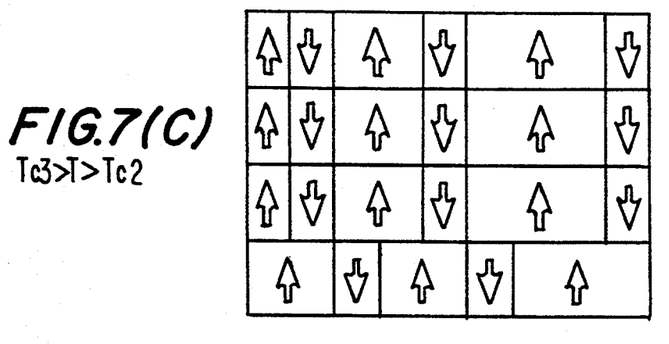
Figure 7D:
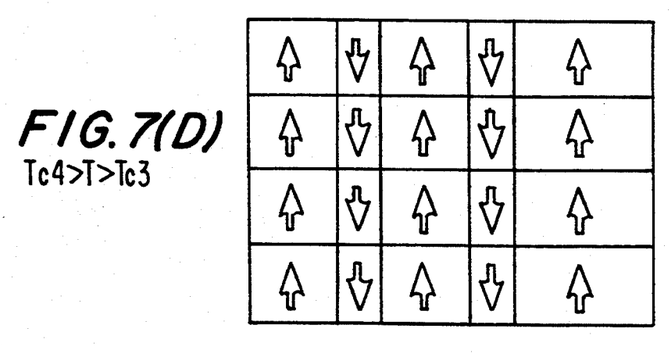

With the procedures given above, the information can be written on the respective perpendicular magnetizing film layers. In this example, the write magnetic field is modulated, but recording can be also performed by light modulation. In that case, an erasing process is needed. FIG. 6 shows one example thereof. Referring to FIG. 6, there are shown a beginning state where recording on the fourth perpendicular magnetizing film layer has already been finished illustrated in FIG. 6(a), and shows a process of writing an arbitrary magnetic domain pattern on the third perpendicular magnetizing film layer. When rising the temperature Tw3 by applying an erase magnetic field 601 upwards with such a magnitude Hw as to meet the formula 7, 8 and 9, as illustrated in FIG. 6(b), the first second and third perpendicular magnetizing film layers are magnetized uniformly upwards, i.e., erased. When pertially rising the temperature Tw3 by modulating the beam with the magnitude Hw and the downward recording magnetic field 602, that portion is magnetized downwards, and it follows that, as illustrated in FIG. 6(c), a desired magnetic domain pattern is recorded on the third perpendicular magnetizing film layer. The magnetic domain patterns can be recorded on other perpendicular magnetizing film layers in the same way.

Next, a reproducing method will be described. When the magneto-optical recording medium is irradiated with linear polarized light, the reproduction is effected by utilizing a Kerr effect in which a polarizing plane of the reflected light thereof rotates corresponding to a state of magnetization of the medium. The Kerr effect is, however, determined depending on the magnetizing state in the vicinity of the plane where the reflection takes place. Hence, in general, only the information on the perpendicular magnetizing film layer closest to the incident side of the beam can be read. FIG. 7 shows a method of reproducing the information recorded sequentially on the first, second, third and fourth perpendicular magnetizing film layers. The explanation will hereinafter be given with reference to FIG. 7.

At the first onset, the information on the first perpendicular magnetizing film layer is reproduced. A content thereof is stored temporarily in other storage unit or in other region on the same medium. Subsequently, a power of the laser beam is set to obtain such a temperature Tr2 as to meet the formula 16 and 17, and continuous irradiation is performed.

$$Hc1(Tr2) < \sigma w12(Tr2)/(2Ms1(Tr2)h1) \quad \text{Formula 16}$$

$$Hc2(Tr2) > (\sigma w12(Tr2) + \sigma w23(Tr2))/(2Ms2(Tr2)h2) \quad \text{Formula 17}$$

The relations of the formula 16 and 17 are conditions for transferring the magnetic domain pattern of the second perpendicular magnetizing film layer onto the first perpendicular magnetizing film layer without changing the magnetic domain pattern on the second perpendicular magnetizing film layer. The temperature is increased up to Tr2, whereby the information on the second perpendicular magnetizing film layer is transferred onto the first perpendicular magnetizing film and is reproducible by the reflected light. Reproduction is attained while being transferred. The reproduced information is temporarily stored in other storage unit or in other region on the same medium. A power of the beam is again set to acquire such a temperature Tr3 as to satisfy the formula 18 and 19, and the continuous irradiation is carried out.

$$Hc2(Tr3) < \sigma w23(Tr3)/(2Ms2(Tr3)h2) \quad \text{Formula 18}$$

$$Hc3(Tr3) > (\sigma w23(Tr3) + \sigma w34(Tr3))/(2Ms3(Tr3)h3) \quad \text{Formula 19}$$

Relations of the formula 16 and 17 are conditions for transferring the magnetic domain pattern of the third perpendicular magnetizing film layer onto the first and second perpendicular magnetizing film layer without changing the magnetic domain pattern on the third perpendicular magnetizing film layer. The information on the third perpendicular magnetizing film layer is transferred onto the first perpendicular magnetizing film layer by rising the temperature up to Tr3 and is reproducible by the reflected light. Reproduction is attainable while being transferred. The reproduced information is temporarily stored in other storage unit or in other region on the same medium.

Further, a power of the laser beam is again set to obtain such a temperature Tr4 as to meet the formula 20 and 21, and the continuous irradiation is executed.

$$Hc3(Tr4) < \sigma w34(Tr4)/(2Ms3(Tr4)h3) \quad \text{Formula 20}$$

$$Hc4(Tr4) > (\sigma w34(Tr4))/(2Ms4(Tr4)h4) \quad \text{Formula 21}$$

Relations of the formula 20 and 21 are conditions for transferring the magnetic domain pattern of the fourth perpendicular magnetizing film layer onto the first, second and third perpendicular magnetizing film layer without changing the magnetic domain pattern on the fourth perpendicular magnetizing film layer. The information on the fourth perpendicular magnetizing film layer is transferred onto the first perpendicular magnetizing film by rising the temperature up to Tr4 and is reproducible by the reflected light. The Reproduction is attainable while being transferred. When the reproduction of the desired layer is done, however, the information on the layers closer to the incident side of the beam than this layer are to be lost and therefore stored temporarily in the storage unit or in other region on the same medium. After being reproduced, it is necessary to perform rerecording. Rerecording may be based on the recording method explained before. Excepting the magneto-optical recording medium of this invention, the magneto-optical reproducing method of this invention is applicable to a structure having 2 or more perpendicular magnetizing films layers exchange-coupled and to the arrangement that the function to hold the information exists in layers deeper than the first layer.

To promote the transfer during the reproduction, the perpendicular magnetizing film layers closer to the incident side of the beam than the desired perpendicular magnetizing film layer can be magnetized uniformly in one direction, or a proper magnetic field can be applied and is also effective during the transfer.

Employed as another embodiment is such a structure that magnetic film layers having no magnetic anisotropy is interposed between the two perpendicular magnetizing film layers, or magnetic film layers having the magnetic anisotropy in a direction other than the direction perpendicular to the film plane is interposed therebetween. The wall energy $\sigma w$ when causing a domain wall between the two perpendicular magnetizing films is relatively as large as 1.5-3 erg/cm². To meet the condition of the formula 21 from the formula 5, the thickness of each layer is required to be relatively large. When using a rare-earth metal—transition metal alloy, a thickness of 100 nm or greater is needed in the great majority of cases. the wall energy $\sigma w$ can be reduced down to 0.5-1.2 erg/cm² by inserting non-perpendicular magnetizing film layers in positions where the domain walls are formed. The thickness of each layer is also decreased. Expanded are ranges of the magnitude of the write magnetic field, the temperature during the recording process and the temperature during the reproducing process, thereby facilitating the recording-/reproducing processes.

The information can be recorded on and reproduced from the perpendicular magnetizing film layers deeper than the first layer in the arbitrary number of perpendicular magnetizing film layers thus stacked. This embodiment has dealt with the 4-layered structure. The recording method and the reproducing method discussed herein can be performed irrespective of the number of layers. Hence, the present invention can be actualized by an arbitrary plural number of layers. Besides, even if multi-layer recording as in the magneto-optical recording medium of this invention is not desired, the magneto-optical reproducing method or the optomagnetic recording method according to the present invention is usable in such cases that the structure is obtained by the 2 or more magnetizing films exchange-coupled, and the information holding function exists in the layers deeper than the first layer.

What is claimed is:

1. A method of reproducing information stored in a magneto-optic recording medium, comprising:

providing a magneto-optical recording medium formed with a transparent substrate for receiving a beam of light and a plurality of layers of perpendicularly magnetized thin film magnetic recording layers supported by and successively farther from the substrate, including at least a first magnetic recording layer closest to the substrate and a second magnetic recording layer on the first magnetic recording layer and farther from the substrate, each magnetic recording layer having a plurality of magnetic domains exchange-coupled with the magnetic domains of an adjacent magnetic recording layer and the Curie temperature of each magnetic recording layer increasing as the layers are successively farther from the substrate, the magnetic recording layers constructed so that a magnetic domain of each layer can be magnetized with an upward or downward orientation, regardless of the magnetic orientation of an adjacent magnetic recording layer;

directing a beam of polarized light to a first magnetic domain of the first magnetic recording layer and measuring the rotation of the light caused by the first magnetic domain to determine the magnetic orientation of the first domain;

raising the temperature of the first domain to a level at which the first domain will adopt the magnetic orientation of a second magnetic domain of the second magnetic recording layer adjacent to the first domain of the first magnetic recording layer; and directing a beam of polarized light to the first domain of the first magnetic recording layer and measuring the rotation of the reflected light to determine the magnetic orientation of the second magnetic domain of the second magnetic recording layer.

2. The method of reproducing information of claim 1, wherein the magnetic recording layers of the medium satisfy the following criteria:

$$Hc(n) - \sigma w(n)/(Ms(n)h(n)) > 0 \text{ (at } 2 \leq n \leq NL-1)$$

$$Hc(n) - \sigma w(n)/(2Ms(n)h(n)) > 0 \text{ (at } n=1, NL)$$

wherein NL is the number of magnetic recording layers; n is the number of the magnetic recording layer successively from the substrate; Hc(n) is the coercive force of an n-th magnetic recording layer; $\sigma w(n)$ is the wall energy of the n-th magnetic recording layer; Ms(n) is the magnetic moment of the n-th magnetic recording layer.

3. The method of claim 1, wherein after the magnetic domain of the of magnetic recording layer closer to the substrate than the magnetic domain of the adjacent magnetic recording layer farther from the substrate adopts the orientation of the adjacent magnetic domain of the adjacent magnetic recording layer farther away from the substrate, the magnetic orientation of the closer magnetic domain is restored without affecting the magnetic orientation of the farther magnetic domain.

4. The method of claim 3, wherein the orientation of the closer magnetic domain of the magnetic recording layer closer to the substrate is restored by applying a magnetic bias field having a selected orientation to the closer magnetic domain of the closer magnetic recording layer and raising the temperature of the closer magnetic domain to adopt the magnetic orientation of the applied bias field, the strength of the bias field and the temperature selected so as not to change the magnetic orientation of the farther magnetic domain of the adjacent magnetic recording layer farther away from the substrate.

5. The method of claim 3, wherein the plurality of magnetic recording layers includes four adjacent magnetic recording layers, including a third magnetic recording layer on the second magnetic recording layer and a fourth magnetic recording layer on the third magnetic recording layer, each of the four magnetic recording layers including a plurality of magnetic domains and the magnetic domains of each of the four adjacent magnetic recording layers being adjacent the respective magnetic domains of the magnetic recording layer or layers adjacent that layer.

6. The method of claim 5, wherein information is read from a magnetic domain of the fourth magnetic recording layer by raising the temperature of adjacent magnetic domains of the first, second and third magnetic recording layers to a level high enough so that the adjacent magnetic domain of each of the first, second and third magnetic recording layers adopts the magnetic orientation of the magnetic domain of the fourth magnetic recording layer;

directing a beam of polarized light to the adjacent magnetic domain of the first magnetic recording layer;

measuring the rotation of the reflected light to determine the magnetic orientation of the magnetic domain of the fourth magnetic recording layer and storing data defining the magnetic orientation of the domain of the fourth magnetic recording layer.

7. The method of claim 6, including the step of restoring the magnetic orientation of a magnetic domain of a selected one of the first, second or third magnetic recording layers by raising the temperature of the adjacent magnetic domains of the first, second, third and fourth layers and applying a magnetic bias field having the determined orientation to the magnetic domains of the first, second, third and fourth layers, the strength of the magnetic bias field and the temperature selected so that the magnetic bias field will not affect the magnetic orientation of the adjacent magnetic domains of the magnetic recording layer or layers further from the substrate than the selected magnetic recording layer, but will change the magnetic orientation of the adjacent magnetic domain of the selected magnetic recording layer to the orientation of the magnetic bias field.

8. The method of claim 6, including the step of restoring the magnetic orientation of the magnetic domain of at least the first magnetic recording layer to the same magnetic orientation that the magnetic domain of said at least first magnetic recording layer had prior to the step of reading the information from the magnetic domain of the fourth layer.

9. The method of claim 7, wherein the temperature of the adjacent magnetic domains are raised by focusing a laser beam of selected power on the adjacent magnetic domains.

10. The method of claim 1, wherein the temperature of the first magnetic domain is raised by focusing a laser beam of selected power on the first magnetic domain.

* * * * *